R. B. FAGEOL.
VEHICLE RUNNING GEAR.
APPLICATION FILED JAN. 5. 1915.
1,160,499.
Patented Nov. 16, 1915.
2 SHEETS—SHEET 1.
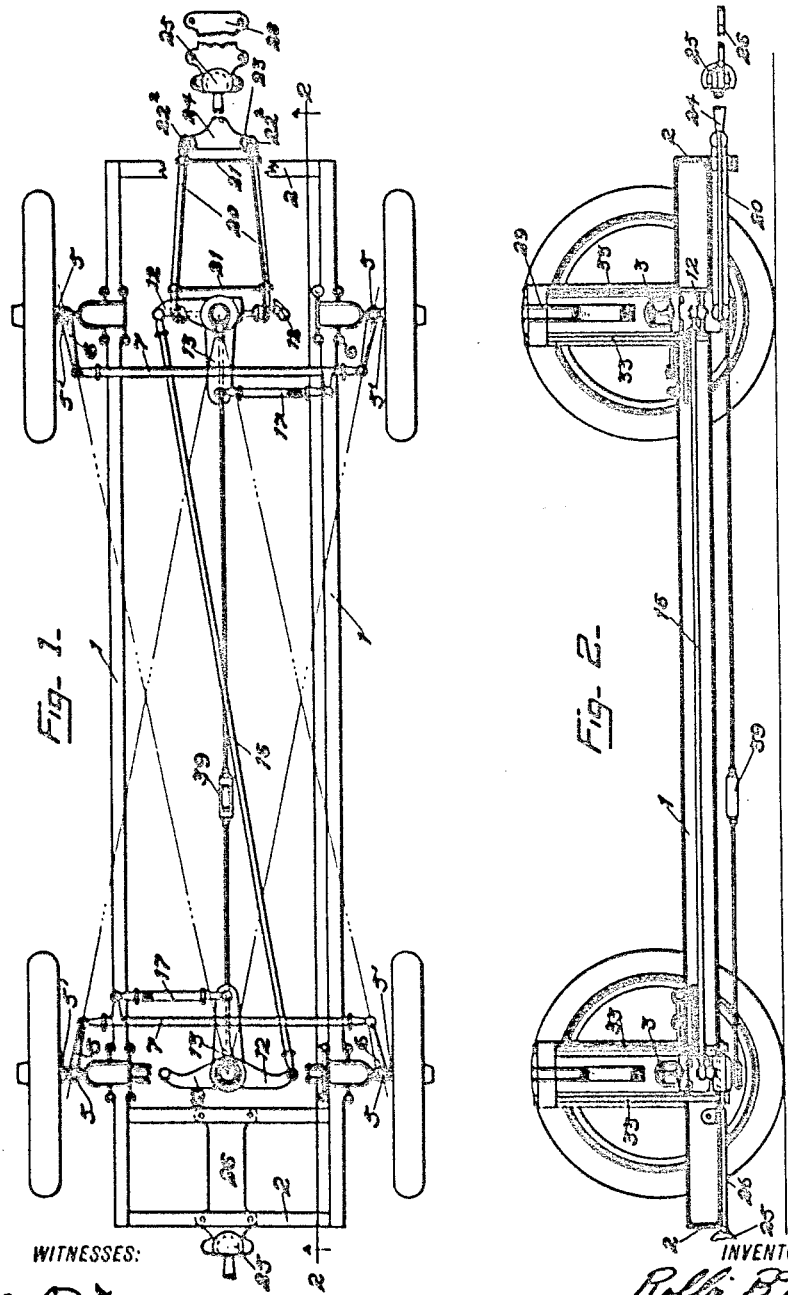

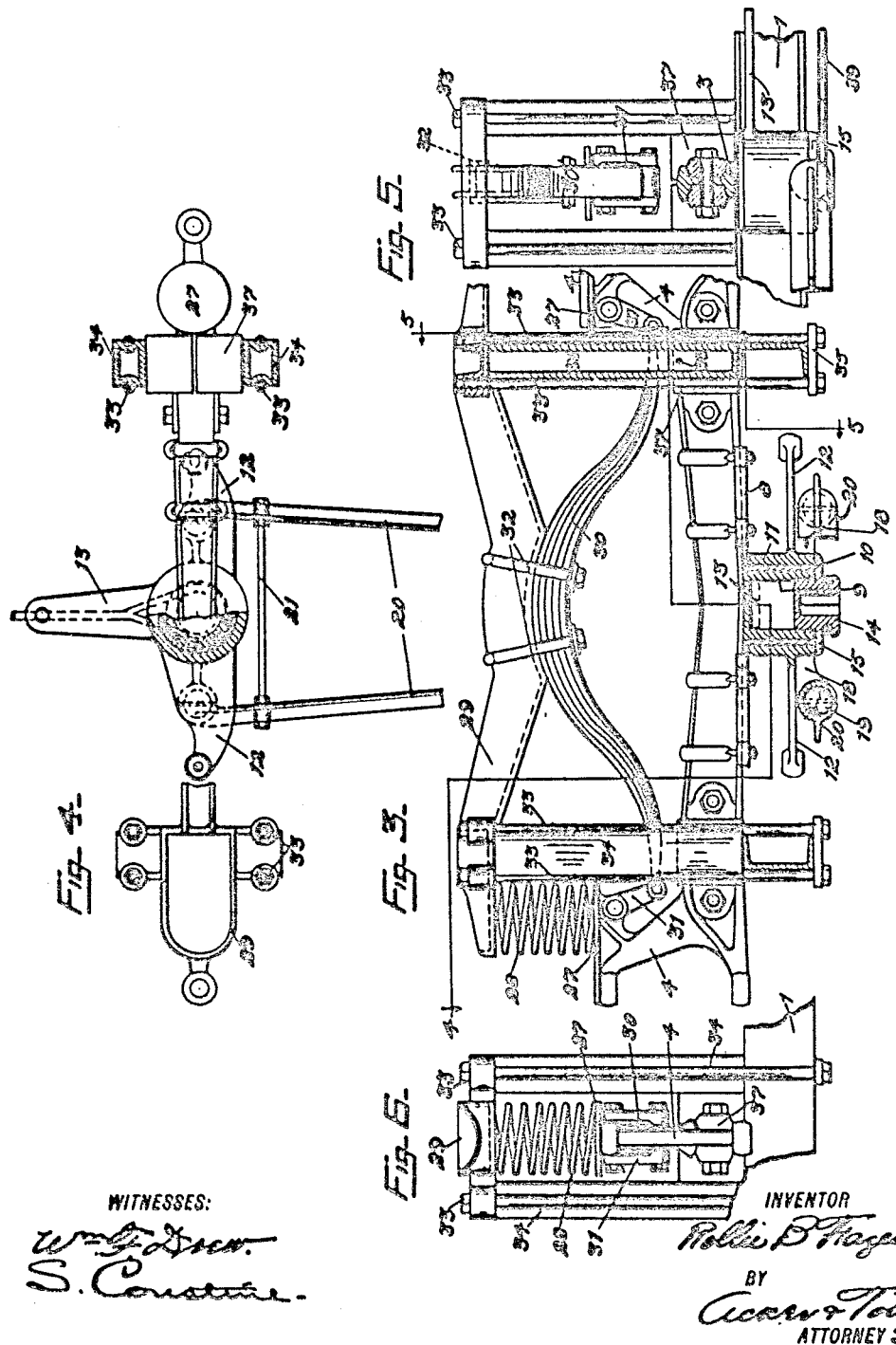

UNITED STATES PATENT OFFICE.

ROLLIE B. FAGEOL, OF OAKLAND, CALIFORNIA.

VEHICLE RUNNING-GEAR.

1,160,499.

Specification of Letters Patent. Patented Nov. 16, 1915.

Application filed January 5, 1915. Serial No. 615.

*To all whom it may concern:*

Be it known that I, ROLLIE B. FAGEOL, a citizen of the United States, residing at Oakland, in the county of Alameda and State of California, have invented certain new and useful Improvements in Vehicle Running-Gears, of which the following is a specification.

The present invention relates to an improved vehicle running gear, and more particularly to a type of structure designed for use in connection with what are commonly termed as trailers, wherein it is desired to have each vehicle or trailer in rear of the source of power following the tracks of the preceding vehicle of the train.

The invention has for its objects to provide an improved running gear having an improved short turning gear, which will enable the rear vehicle wheels to travel in the same path as the front wheels, either when turning corners or traveling in a straight line; to provide a running gear having an improved spring suspension for the frame, whereby the frame will be uniformly depressed on a load being placed thereon.

With the above mentioned and other objects in view, the invention consists in the novel construction and combination of parts hereinafter described, illustrated in the accompanying drawings and set forth in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in top plan of a vehicle running gear embodying my invention. Fig. 2 is a view in longitudinal section, taken on line 2—2 of Fig. 1. Fig. 3 is a transverse sectional view, disclosing one of the axles and frame supporting springs associated therewith. Fig. 4 is a broken sectional view taken on line 4—4 of Fig. 3. Fig. 5 is a vertical sectional view taken on line 5—5 of Fig. 3. Fig. 6 is a view in end elevation of the structure disclosed in Fig. 3.

Referring more particularly to the drawings, wherein like characters of reference designate corresponding parts throughout the several views—1 are the side frame members connected by the end members 2, and extending transversely over said side frame members are the axles 3 vertically forked, as at 4, and in said forks turn on a vertical pivot 5, a steering knuckle 5' carrying the spindles to which the road wheels are journaled. The vertical pivots each carrying a steering knuckle arm 6, and corresponding arms are connected by a tie rod 7.

Secured to the underside of each axle is a plate 8 formed with a downwardly projected hollow trunnion 9, each of which is located centrally of their respective axles. A bushing 10 surrounds each trunnion and rotatable thereon is the hub 11 of a substantially T-shaped casting formed with side arms 12 and main arms 13, and said castings are retained in position on their respective trunnions by a cap 14 threaded thereto and formed with a flange 15.

A side arm 12 extending from one side of the pivotal point of one of the castings carried by one axle is pivotally connected at its end through a link 16 with one end of one of said side arms extending from the opposite side of the pivotal point of the casting carried by the opposite axle, and the main arms 13 of the castings are each connected by links 17 with the tie rods 7 associated therewith.

It will be observed that the front and rear wheels being connected as above described, will on the turning of one of the T-castings follow in the tracks of the preceding wheel. In my improved construction the wheels are so set that a line through the vertical pivots 5 of the steering knuckles 5' to the center of the opposite trunnion 9 will pass through the center of the pivotal point of the tie rod 7 and the steering knuckle arm 6 associated with the pivot. It is this construction which enables the rear wheels to always track with the front wheels, either when going in a straight line or in making a turn.

From the hub 11 of the T-casting associated with the front of the vehicle are the laterally projecting arms 18 formed beneath the arms 12, and the same are formed at their ends with cup shaped recesses in which fit bearings 19. Over said bearings 19 fit the cupped ends of draw bar links 20 which are connected together by rods 21 and the outer ends of said links are cupped, as at 22, and retain bearings 23 which rest in suitable sockets in the inner end of a casting 24, situated between the outer ends of said links. The end of said casting is preferably spherical, and said ends of succeeding vehicles are received in a suitable socket 25 of a draw member 26 carried by the rear portion of the frame of a preceding vehicle. A draw bar constructed and mounted as described, permits of a universal movement between the connected vehicles.

Supporting bases 27 are provided on the upper portion of each upper fork member at the ends of the axles 3, and on the same rest coil compression springs 28 which support the ends of yokes 29, and each of said yokes rests on and is supported centrally by the upwardly bowed leaf spring structure 30, pivotally connected at each end to the underside of the bases 27 by a link 31. Suitable U-bolts 32 detachably unite the yokes and the leaf spring structures, adjacent the central portions thereof.

Suitable bolt receiving eyes are formed on either side of the yokes 29 adjacent their ends, and through the same extend the parallel spaced bolts 33 between which are held the spacing members 34, which contact at their upper ends with the underside of the yokes and at their lower ends rest on the side frame members 1 and said bolts are connected at their lower ends by the plates 35 which pass under the side frame members 1.

The spacing members 34 are each formed with a central channel 36 adapted to contain a quantity of lubricant soaked waste and are adapted to operate at their inner faces over guides 37 carried by the sides of the axles 3. The inner surfaces of the spacing members 34 are formed with oil hubs 38 to permit lubricant to pass from the interior thereof and lubricate the surface between the spacing members and the guides.

A suitable truss rod 39 connects the cap 14, and the opposite ends of said rod are received in grooves in the respective caps.

It will be apparent that I have provided a vehicle running gear having a low center of gravity, this being accomplished by extending the frame beneath the supporting axles and hanging the same on the supporting springs.

By my improved spring suspension load pressures placed on the frame will be uniformally supported by the springs.

Having thus described my invention what I claim is:—

1. A vehicle running gear comprising a frame, front and rear supporting axles, vertically pivoted wheel supporting spindles carried by said axles and each formed with an arm, wheels on said spindles, a tie rod connecting the arms of the spindles on the respective axles, a vertically pivoted bell crank adjacent each axle, a link connection between one arm of each bell crank and the adjacent tie rod, a link connecting the other arm of said bell cranks, and a steering connection associated with the bell crank of said front axle.

2. A vehicle running gear comprising a frame, front and rear supporting axles carrying movable wheel supporting spindles, wheels on said spindles, means connecting the spindles on the respective axles, means adjacent each axle for controlling the movement of the supporting spindles associated therewith, a connection between the supporting spindle controlling means on the respective axles, and a steering connection associated with the supporting spindle controlling means of the front axle.

3. A vehicle running gear comprising a frame, front and rear supporting axles carrying movable wheel supporting spindles, wheels carried by said spindles, means associated with the front axle to cause the front wheels to operate in unison in the same direction, means associated with the rear axle to cause the rear wheels to operate in unison in the same direction, a connection between the front and rear wheel steering means to operate said pairs of wheels in unison in opposite directions, a steering and draw bar pivoted on a horizontal axis to operate with said front wheels and connected for universal pivotal movement at its opposite end with a draw member carried by a second vehicle, said draw and steering bar formed of a plurality of sections, the coöperating ends of which are connected to pivot on a horizontal axis.

4. A vehicle running gear comprising a frame, front and rear supporting axles, each carrying movable wheel supporting spindles, wheels carried by said spindles, tie rods one associated with the spindles of each axle for connecting the same to operate in unison in the same direction, and means connecting the respective tie rods for causing the front and rear wheels to steer simultaneously in the opposite directions, a journaled member coöperating with the tie rod connecting means, and a steering and draw bar connected to pivot at one end with said journaled member on a horizontal axis and connected for universal pivotal movement at its opposite end with a draw member carried by a second vehicle, said draw and steering bar formed of a plurality of sections, the coöperating ends of which are connected to pivot on a horizontal axis.

5. A vehicle running gear comprising a frame, front and rear supporting axles, vertically pivoted wheel supporting spindles carried by said axles, wheels on said spindles, a tie rod connecting the spindles of the respective axles, a vertically pivoted bell crank carried by each axle and one arm of each bell crank connected to the tie rod connecting the spindles of the respective axles, and a link connecting the free arm of the respective bell cranks to operate the same to cause the pairs of wheels to steer in unison in opposite directions.

6. A vehicle running gear comprising supporting axles and wheels therefor, a frame extending under said axles, an upwardly bowed supporting spring member carried at its ends by each of said axles and extending longitudinally thereof, yokes each resting at its center on one of said spring members, and supporting rods carried adjacent the ends of said yokes for supporting said frame.

7. A vehicle running gear comprising front and rear supporting axles and wheels therefor, a frame extending under said axles, upwardly bowed supporting spring members one carried at its ends by each of said axles and extending longitudinally of its associated axle, yokes resting at their centers one on each supporting spring, supporting rods carried adjacent the ends of the said yokes for supporting the frame, and coiled springs interposed between the ends of the yokes and their respective axles.

8. A vehicle running gear comprising a pair of supporting axles provided at their ends with raised portions, a frame extending under said axles, supporting springs each bowed upwardly at its center and each adapted to extend longitudinally of the upper surface of one of said axles, links connecting the ends of said springs with said raised portions of said axles, a yoke associated with each spring and resting on the bowed portion thereof, and means associated with said yokes for supporting said frame.

9. A vehicle running gear comprising a pair of supporting axles formed adjacent their ends with raised portions, a frame, supporting springs each bowed upwardly at its center and each extended longitudinally of the upper surface of one of said axles and each pivotally hung at its ends beneath said raised portions, a yoke associated with each spring and resting on the bowed portion thereof, and means associated with said yokes for securing said frame thereto.

10. A vehicle running gear comprising a pair of supporting axles formed adjacent their ends with raised springs each bowed upwardly at its center and each extended longitudinally of the upper surface of one of said axles and each pivotally hung at its ends beneath said raised portions, a yoke associated with each spring and resting on the bowed portion thereof, coiled springs interposed between said yokes adjacent their ends and said spring supporting portions, and means associated with said yokes for securing said frame thereto.

11. A vehicle having steering mechanism, comprising a journaled member, a steering and draw bar connected to pivot at one end with said journaled member on a horizontal axis and connected for universal pivotal movement at its opposite end with a draw member carried by a second vehicle, said draw and steering bar formed of a plurality of sections, the coöperating ends of which are connected to pivot on a horizontal axis.

In testimony whereof I have signed my name to this specification in the presence of two subscribing witnesses.

ROLLIE B. FAGEOL.

Witnesses:
HARRY A. TOTTEN,
D. B. RICHARDS.

Copies of this patent may be obtained for five cents each, by addressing the "Commissioner of Patents, Washington, D. C."